Jan. 8, 1946.　　　J. CAFAGNO　　　2,392,363
WORK GAUGE AND RECEIVER
Filed Feb. 8, 1944　　2 Sheets-Sheet 2
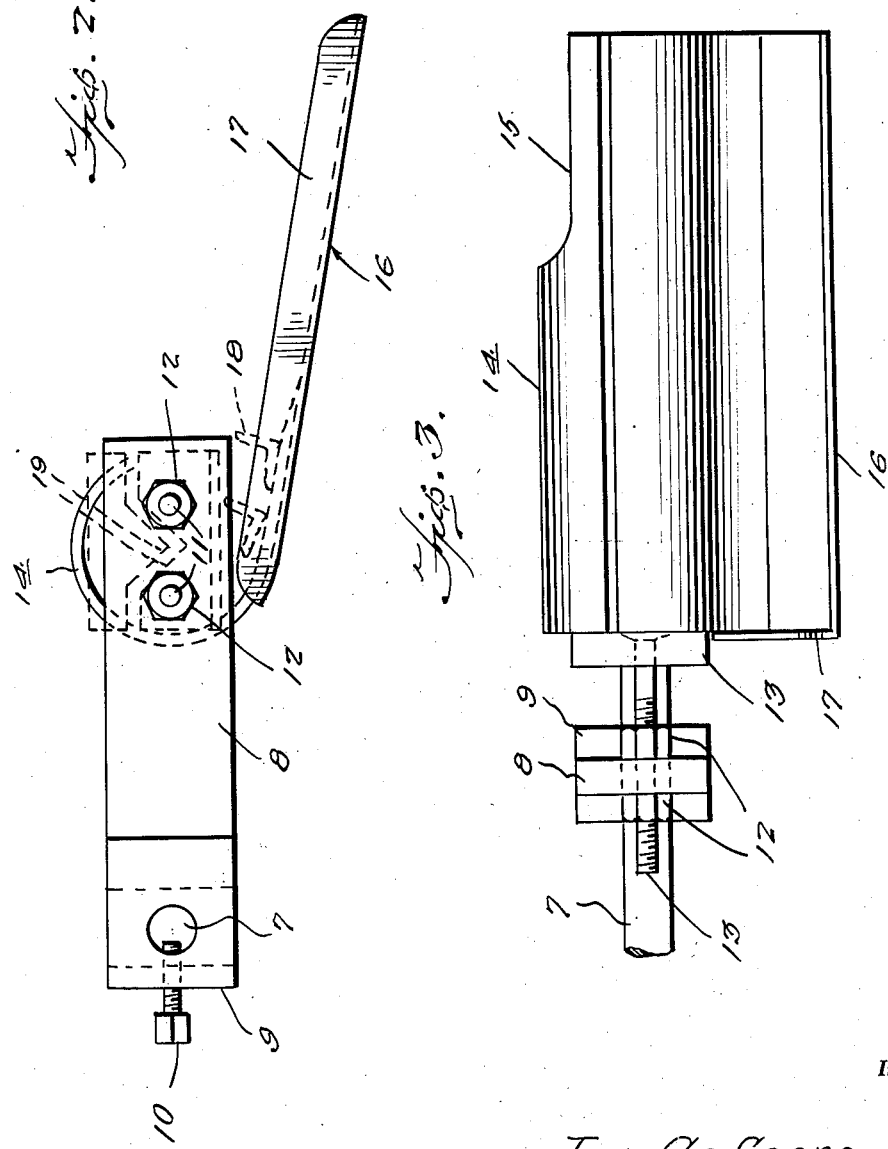
Inventor
Joe Cafagno Patented Jan. 8, 1946

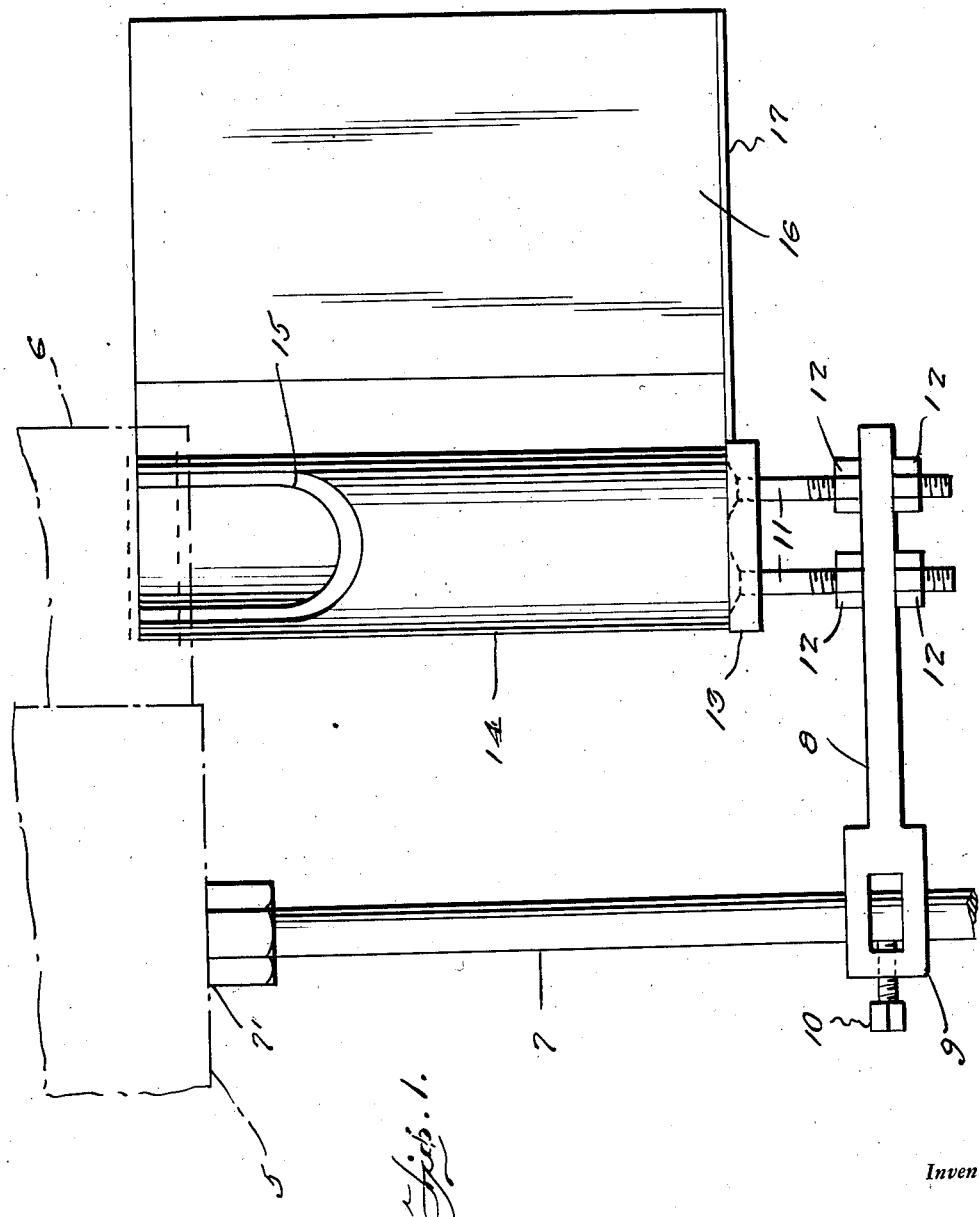

2,392,363

UNITED STATES PATENT OFFICE 2,392,363

WORK GAUGE AND RECEIVER

Joe Cafagno, Marion, Ohio

Application February 8, 1944, Serial No. 521,544

3 Claims. (Cl. 164—59)

This invention relates to a work gauging and receiving attachment for shearing machines, and is particularly designed to gauge the length of sections cut from bars of angle iron in the manufacture of fence post anchors, and to successively receive and retain a number of said sections in side-by-side relation so that the sections need not be handled or caught and removed one at a time.

The primary object of the invention is to provide a device or attachment of the above kind which is comparatively simple and durable in construction, economical to manufacture, easy to install, and highly efficient in use.

Other and specific objects and features of the invention will become apparent from the following description when considered in connection with the accompanying drawings, and the invention consists in the novel form, combination and arrangement of parts hereinafter more fully described, shown in the drawings and claimed.

In the drawings, wherein like reference numerals indicate corresponding parts throughout the several views:

Figure 1 is a top plan view of a work gauging and receiving device constructed in accordance with the present invention.

Figure 2 is an elevational view thereof looking upwardly at Figure 1.

Figure 3 is a side view looking toward the left of Figure 2.

Referring in detail to the drawings, the frame and the shear head of a shearing machine are respectively illustrated by dotted lines at 5 and 6 in Figure 1. The present invention includes a horizontal gauge bar 7 adapted to be fixed at one end, as at 7', to the machine frame 5 so as to project therefrom parallel with and to one side of the position in which the angle bars are disposed under the shear head 6 when cutting the same into lengths. A gauge arm 8 is slidably mounted at one end for adjustment longitudinally on the gauge bar 7 and projects laterally from the latter in a direction toward the shear head 6. Preferably, the arm 8 has an enlarged end 9 that is apertured to slidably receive the gauge bar 7, and a set screw 10 is provided on the enlarged end 9 to impinge the gauge bar 7 and secure the arm 8 in adjusted position with respect to gauge bar 7. The other end of arm 8 has a pair of openings through which slidably project adjusting bolts 11 having nuts 12 threaded thereon at opposite sides of the arm 8. The bolts 11 are fixed to and project outwardly from a gauge plate 13 fixed across the outer end of a tubular guide 14 which is split or open at the side remote from the gauge bar 7, as shown clearly in Figures 2 and 3, to provide an exit for the sections cut from the angle bars. The guide 14 is horizontally disposed parallel with gauge bar 7 and its inner end is disposed adjacent the shearing knives of the shearing machine, as indicated by dotted lines in Figure 2. The arrangement is such that when the angle bar is positioned between the knives with an end portion extending into the guide 15 so as to abut the gauge plate 13 at its free end, the shear knives of the machine will cut a section from said angle bar of a predetermined length, depending upon the adjustment of the guide 14 relative to arm 8 and the adjustment of arm 8 along gauge bar 7. The adjustment of arm 8 along bar 7 will give a quick rough adjustment, after which fine or accurate adjustment is effected by loosening nuts 12 and then adjusting them to vary the distance of guide 14 from arm 8. As shown at 15, the inner end of guide 14 is cut away at the top so as to provide clearance for the shear head of the shearing machine. Fixed at one end to and extending at an inclination from the lower portion of guide 14 is a slightly inclined chute 16 having an upstanding flange 17 along its outer edge. Chute 16 extends from the guide 14 in a direction away from the gauge bar 7, as shown.

In use, the angle bar is positioned between the knives of the shearing machine so that an end portion projects into the guide 14 and abuts the gauge plate 13. The shearing machine is then operated so as to shear a section from the angle bar constituting that portion of the latter projecting into the guide 14. This section falls by gravity to the bottom of guide 14 and gravitates slightly down the chute 16. As this operation is repeated, the sheared sections will gravitate down the chute 16 in adjacent side-by-side or somewhat stacked relation until the chute is full, whereupon the entire batch of sheared sections may be removed. In this way, no attendant is required to individually handle or catch and remove the sheared sections as they are cut from the bar of angle iron, and the operator of the shearing machine may periodically remove an accumulated number of sheared sections from time to time as found necessary. Several of the sheared sections of angle iron are indicated by dotted lines at 18 in Figure 2, the shearing knives of the shearing machine being indicated by dotted lines at 19 in the same view. Obviously, the length of the sheared sections cut from the bars of angle iron may be varied and predetermined by the adjustment of gauge plate 13 toward or from the shearing knives of the shearing machine through the medium of the two adjustments described.

From the foregoing description, it is believed that the construction and operation, as well as the advantages of the present invention, will be readily understood and appreciated by those skilled in the art. Minor changes in details of construction illustrated and described are contemplated, such as fairly fall within the spirit and scope of the invention as claimed.

What I claim as new is:

1. A work gauge and receiver of the character described comprising a horizontal gauge bar, a tubular work guide parallel with and mounted on the gauge bar for adjustment longitudinally of the latter, said guide having a gauge plate at its outer end and being open at one side to provide a work exit, and an inclined work-receiving chute rigid with and extending laterally from the lower portion of said work guide.

2. A work gauge and receiver of the character described comprising a horizontal gauge bar, a tubular work guide parallel with and mounted on the gauge bar for adjustment longitudinally of the latter, said guide having a gauge plate at its outer end and being open at one side to provide a work exit, and an inclined work-receiving chute rigid with and extending laterally from the lower portion of said work guide, a gauge arm slidably mounted at one end on the gauge bar, and means rigidly connecting the work guide to the other end of said gauge arm.

3. A work gauge and receiver of the character described comprising a horizontal gauge bar, a tubular work guide parallel with and mounted on the gauge bar for adjustment longitudinally of the latter, said guide having a gauge plate at its outer end and being open at one side to provide a work exit, and an inclined work-receiving chute rigid with and extending laterally from the lower portion of said work guide, a gauge arm slidably mounted at one end on the gauge bar, and means rigidly connecting the work guide to the other end of said gauge arm, said last-named means including an adjusting bolt fixed to the gauge plate and slidably extending through the gauge arm, and means on the adjusting bolt coacting with said gauge arm to effect fine adjustment of the gauge plate toward or from said gauge arm.

JOE CAFAGNO.